United States Patent [19]

Inuiya

[11] 3,966,331

[45] June 29, 1976

[54] COORDINATE DETECTING APPARATUS FOR OPTICAL PROJECTORS

[75] Inventor: Masafumi Inuiya, Asaka, Japan

[73] Assignee: Fuji Photo Film Co., Ltd., Minami-ashigara, Japan

[22] Filed: Aug. 27, 1974

[21] Appl. No.: 501,105

[30] Foreign Application Priority Data

Aug. 27, 1973  Japan.............................. 48-95963

[52] U.S. Cl................................ 356/164; 356/170; 250/233
[51] Int. Cl.²........................................... G01B 9/08
[58] Field of Search........... 356/164, 170, 171, 172; 250/233, 237, 237 G

[56] References Cited
UNITED STATES PATENTS

| | | |
|---|---|---|
| 2,997,699 | 8/1961 | Lovell................................ 250/233 |
| 3,291,991 | 12/1966 | Welti................................. 250/233 |
| 3,617,134 | 11/1971 | Frush et al........................ 356/170 |

*Primary Examiner*—John K. Corbin
*Assistant Examiner*—Jon W. Henry
*Attorney, Agent, or Firm*—Sughrue, Rothwell, Mion, Zinn & Macpeak

[57] ABSTRACT

A coordinate detecting apparatus for detecting a coordinate position on a screen of an optical projector. The coordinate detecting apparatus includes coding means for spacially modulating, when actuated, a picture image on the screen of the optical projector; actuating means for actuating the coding means; detecting means for detecting the modulated signal produced on the screen; and circuit means responsive to the modulated signal, which is detected by the detecting means, for detecting the position of the detecting means on a coordinate with respect to the picture image on the screen to produce a coordinate signal.

4 Claims, 11 Drawing Figures

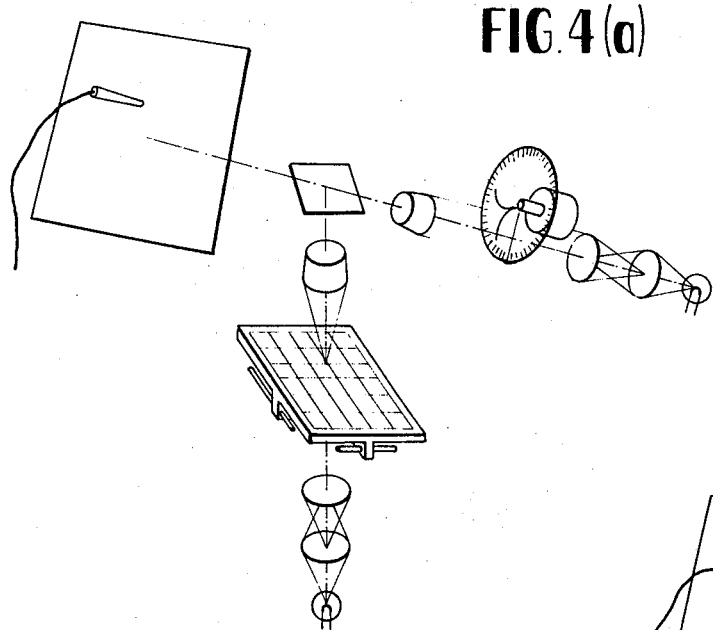
FIG.4(a)
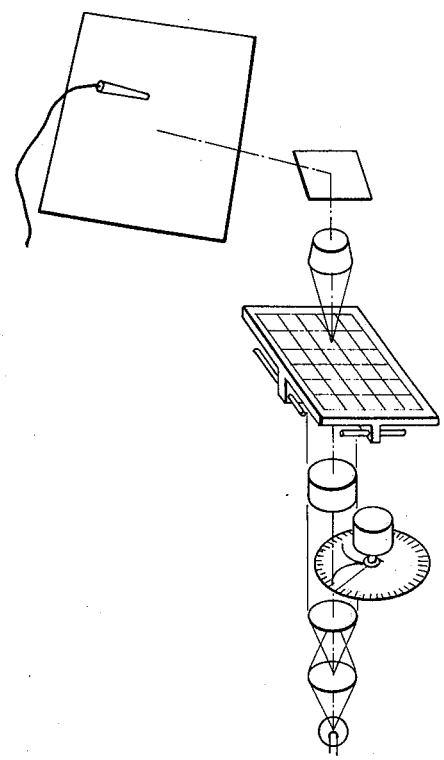
FIG.4(b)
FIG.5
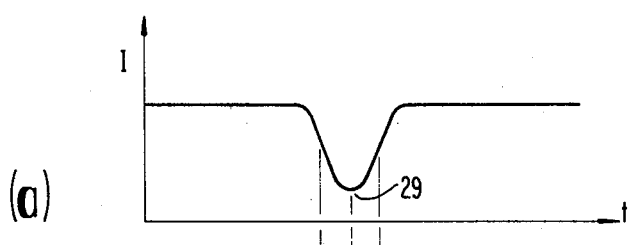
(a)
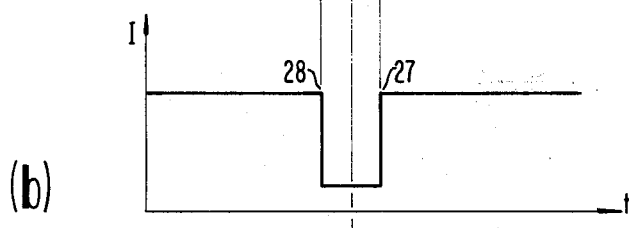
(b)
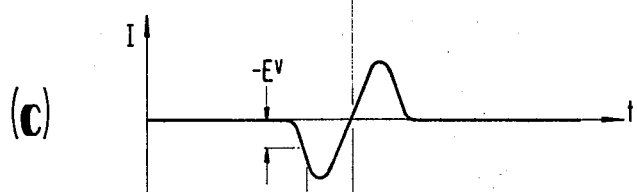
(c)
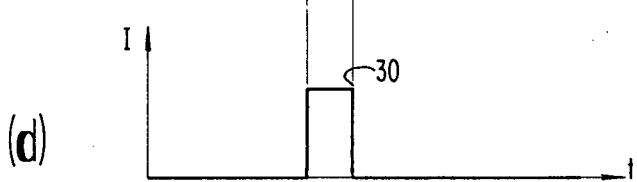
(d)

COORDINATE DETECTING APPARATUS FOR OPTICAL PROJECTORS

BACKGROUND OF THE INVENTION

1. Field of the Invention

The present invention relates to a coordinate detecting apparatus for detecting a coordinate position on a screen of an optical projector, and, more particularly, to a coordinate detecting apparatus of the above type for detecting as a coordinate position information of a picture image on the screen.

2. Description of the Prior Art

An optical projector is an apparatus, in which a portion which is desired by an observer is selected from either a picture image recorded on a film sheet or the like or an object to be observed and then is enlarged and projected on a screen for easy observation. Thus, the present invention is directed to a coordinate detecting apparatus for an optical projector, in which information of a picture image enlarged and projected by the optical projector on a screen which is intended by an observer to be transmitted to an outside processing system such a an electronic computer is directly indicated by the observer on the screen using a light pen so that the particular information can be detected as a coordinate position to be converted into an output signal for indicating the digital coordinate position.

Heretofore, a variety of coordinate detecting apparatuses for a CRT display device have been proposed and some of them have been put into actual practice. However, few coordinate detecting apparatuses have been proposed for an optical projector. Although it is possible to convert some of the coordinate detecting apparatuses for a CRT display device, other than those the type using a light pen resorting to the raster of the CRT, into a coordinate detecting apparatus for an optical projector by making some suitable changes including the use of an ultrasonic pen, a Rand tablet or the like, some special devices on the screen are required resulting in problems including a reduction in economy and picture quality.

SUMMARY OF THE INVENTION

It is, therefore, an object of the present invention to provide a coordinate detecting apparatus which is suitable for an optical projector in which the above drawbacks have been eliminated.

Another object of the present invention is to provide a coordinate detecting apparatus of the above type, in which information of the picture image projected by an optical projector on a screen which is directly indicated by an observer using a light pen is detected as a coordinate position to produce a coordinate signal as a digital quantity.

Still another object is to provide a coordinate detecting apparatus of the above type which can accomplish the above functions without even slightly modifying the optical projector itself.

According to one aspect of the present invention, therefore, a coordinate detecting apparatus for an optical projector is provided, which comprises: coding means for spacially modulating, when actuated, a picture image on a screen of the optical projector; actuating means for actuating the coding means; detecting means for detecting the modulated signal produced on the screen; and circuit means responsive to the modulated signal, which is detected by the detecting means, for detecting the position of the detecting means on a coordinate with respect to the picture image on the screen to produce a coordinate signal.

By adding the coordinate detecting apparatus according to the present invention to an optical projector, an observer can transmit as a coordinate position signal a part of the information of the projected picture image on the screen directly to an information processing system such as an electronic computer by indicating the particular information using a light pen. As a result, an optical projector can be combined with an information processing system or an electronic computer so that the user of the optical projector can process directly a part of the information of the picture image on the screen using a light pen. Thus, a so-called "man-machine" system can be established to remarkably widen the field of use of an optical projector with a resultant increase in commercial utility.

BRIEF DESCRIPTION OF THE ACCOMPANYING DRAWINGS

These and other objects and advantages of the present invention will become apparent from the following description taken in conjunction with the accompanying drawings.

FIGS. 4($a$) and 4($b$) are perspective views showing optical systems for overlapping the code disc image and the microfiche image in the screen.

FIGS. 5($a$), 5($b$), 5($c$) and 5($d$) are graphical presentations showing the wave forms which are obtained when the image of the code disc is detected using a light pen.

Figure 6:
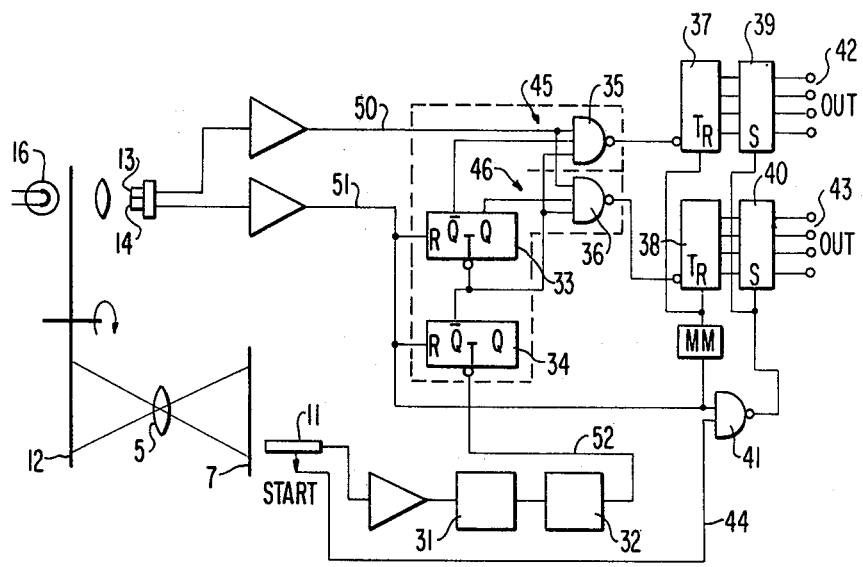

FIG. 6 is a diagrammatical view showing an electric circuit exemplifying the coordinate detecting circuit for the coordinate detecting apparatus of the present invention.

Figure 7:
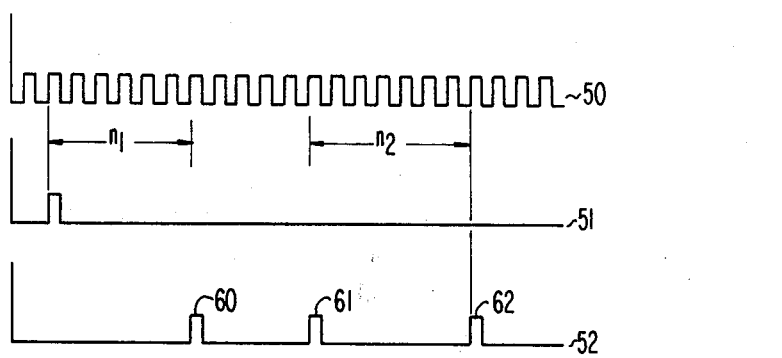

FIG. 7 is a graphical presentation showing operational wave forms of the portions of the coordinate detecting circuit of FIG. 6.

DESCRIPTION OF THE PREFERRED EMBODIMENTS

The present invention will now be described in detail with reference to the accompanying drawings.

Figure 1:
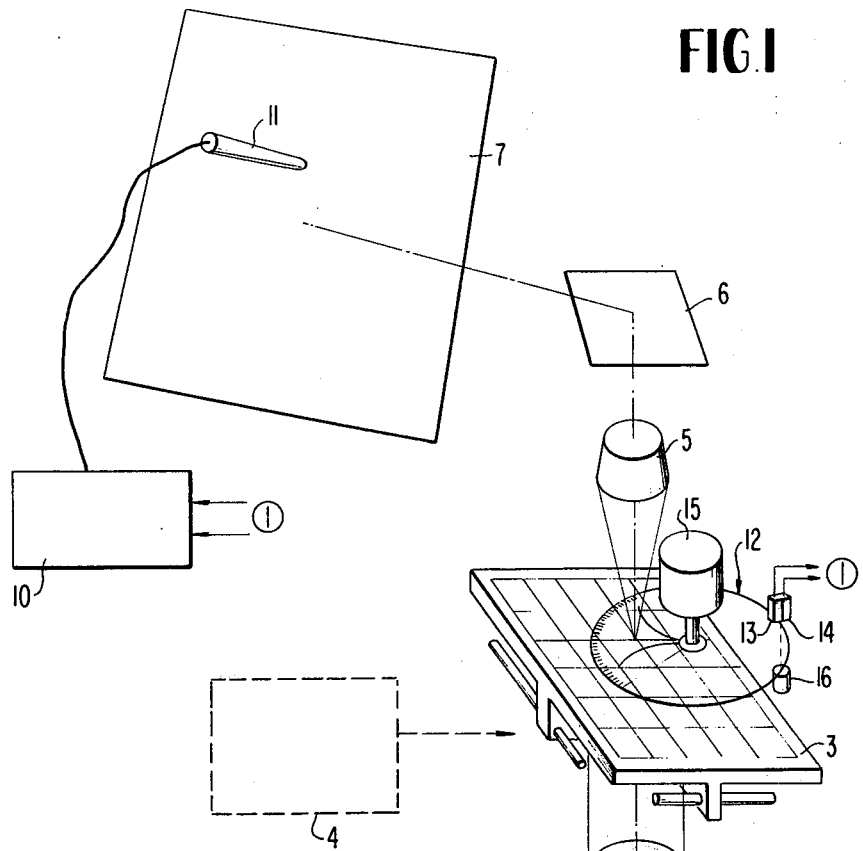
FIG. 1 is a simplified perspective view showing the condition in which a coordinate detecting apparatus according to the present invention is added to an optical projector exemplified by a microreader.

FIG. 1 is a block diagram showing the case, in which the coordinate detecting apparatus according to the present invention is used with an optical projector exemplified by a microreader. The optical projector can be a conventional microreader and includes, by way of example only, a light source 1, a condenser lens 2, a microfiche 3, a microfiche locating system 4, a projecting lens 5, a mirror 6 and a screen 7. As will be easily understood, one frame on the microfiche 3, which is uniformly illuminated by the action of the light source 1 and the condenser lens 2, is enlarged and projected on the screen 7 by the action of the projecting lens 5.

To this microreader is added a coordinate detecting apparatus which includes a coordinate detecting circuit 10, a light pen 11, a code disc 12, a photoelectric element 13 for detecting a clock signal, a photoelectric element 14 for detecting a start signal, a motor 15 and a light source 16.

Figure 2:
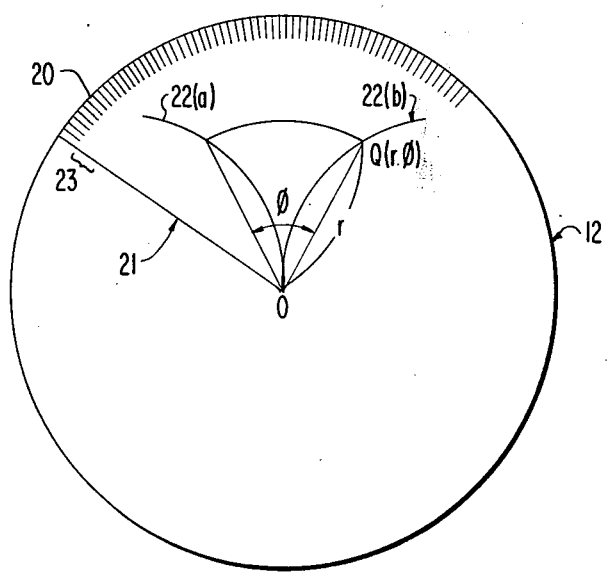
FIG. 2 is a top plan view showing an example of a code disc which can be used in the coordinate detecting apparatus of the invention.

The code disc 12 is made of a transparent material such as an acryl resin or glass, and is interposed, as shown in FIG. 1, between the projecting lens 5 and the microfiche 3. This code disc 12 is rotated at a constant speed by the action of the motor 15. On this code disc 12, as is more apparent from FIG. 2, there are printed several opaque patterns including a clock pattern 20, a $\theta$ - pattern 21, an a $\gamma$ - pattern 22 and a start line 23. The clock pattern 20 is detected, as shown in FIG. 1, photoelectrically by the photoelectric element 13 and is introduced as a clock signal into the coordinate detecting circuit 10. This clock signal is a reference signal for converting the detected coordinate signal into a digital quantity. Therefore, as the scales of the clock pattern 20 are made finer, the coordinate signal, which is dictated by a digital quantity of higher precision can be obtained.

Turning to other patterns on the code disc 12, the start line 23 is photoelectrically detected by the photoelectric element 14 and is converted into a start signal. The $\theta$ - pattern 21 is a half-line passing through the center of rotation 0 of the code disc 12. On the other hand, the $\gamma$ - pattern includes divergent curves passing through the center of rotation 0 of the code disc 12. These divergent curves are equationally expressed such that, if any point on the curves is assumed to have a coordinate $(\gamma,\theta)$, then the relationship $(\gamma-k\phi)$ always remains constant between the distance from the center of rotation 0 to the point $(\gamma,\theta)$ where $\phi$ is the angle of divergence (where the parameter $k$ takes a constant value and FIG. 2 corresponds to the case where $k=4/\pi$). Both the $\theta$ - pattern 21 and the $\gamma$ - pattern 22 are photoelectrically detected from the screen 7 using light pen 11 and are converted into a light-pen signal.

Figure 3:
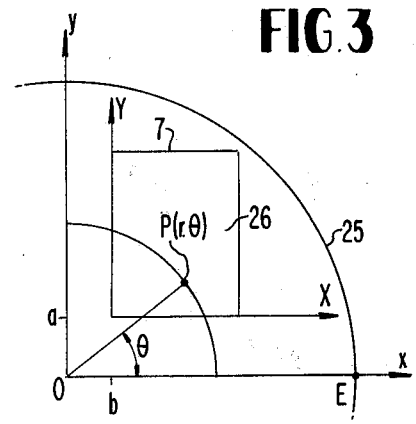
FIG. 3 is an explanatory view showing the relationship between the code disc image and the microfiche image on a screen of the microreader to which the coordinate detecting apparatus of the invention is added.

At the next stage, the image 25 of the code disc 12 and the image 26 of the microfiche 3 are projected, as shown in FIG. 3, so that they overlap one on the other in the screen 7. In order to overlap the code-disc image 25 and the microfiche image 26, more specifically, the optical image such as shown in FIGS. 4(a) and 4(b) can be employed. However, this will result in the optical system becoming quite complicated or, when the coordinate detecting apparatus of the invention is added to a prior-art optical projector, in the necessity for a considerable modification in the optical system in the optical projector.

In a preferred embodiment, optical performance similar to that obtainable using the above complicated optical system can be obtained without even slightly modifying the optical system of the conventional optical projector. In this embodiment, more specifically, the code disc 12 is inserted, as shown in FIG. 1, within the depth of an object of the projecting lens 5 and between both the microfiche 3 and the projecting lens 5 of the conventional microreader, moreover, in the vicinity of the microfiche 3. In the arrangement shown in FIG. 1, however, it is impossible to make both the positions of the microfiche 3 and of the code disc 12 coincide. As a result, when the microfiche image 26 is focussed on the screen 7, images both of the $\theta$ - pattern 21 and of the $\gamma$ - pattern 22 on the code disc 12, which are projected on the screen 7, will be out of focus, so that the distribution of optical intensity of the patterns on the screen will be such as is shown in FIG. 5(a). On the other hand, where an optical system as shown in FIG. 4 is used, the intensity distribution obtainable will be such as is shown in FIG. 5(b). Therefore, where the optical system of FIG. 4 is used, generally it is a practice to adopt the steep rising points 27 and 28 of FIG. 5(b) as a reference point for the signal. Where the distribution is out of focus, however, a similar precision to that obtained using the optical system of FIG. 4 can be maintained if the extreme value 29 (the maximum point or the minimum point) for the signal is used as the reference point for the signal. In order to obtain the extreme value, the light-pen signal is differentiated by a differentiating circuit, and then the point, where the differentiated value is zero, is located by a Schmidt circuit. Here, FIG. 5(c) shows the wave form of the differentiated value of FIG. 5(a). Thus, if a Schmidt circuit, which is rendered conductive when the differentiated wave form takes a voltage level of $-$ EV, and is rendered non-conductive when the wave form takes a zero voltage level, is used then the output wave form as shown in FIG. 5(d) is obtained. Since, in this instance, the rising point, where the output wave form from the Schmidt circuit begins to rise, corresponds to the extreme value of the signal of FIG. 5(a), this particular rising point can be used as the desired reference point.

In FIG. 3 showing the relationship between the screen 7 and the image 25 of the code disc 12 projected thereon, the code disc image 25 in angularly shifted is a counter-clockwise direction about the center 0 relative to the screen 7, on which the microfiche 3 is projected. Now, let it be assumed that an observer points out the point P on the screen 7 using the light pen 11. If, moreover, the point P is expressed in polar coordinates as P $(\gamma,\theta)$, if the start line 23 of the code disc 12 passes that equivalent position E on the screen, which corresponds to the photoelectric element 14 for a start signal, to thereby produce the start signal, and if the image of the $\theta$ - pattern 21 on the code disc 12 then passes the light-pen position P $(\gamma,\theta)$ after $n_1$ pulses of the clock signal from the photoelectric element 13 are counted, then the following relationship holds between the two variables $\theta$ and $n_1$:

$$\theta = 2\pi n_1/m \qquad (1),$$

where the variable m denotes the total clock number required for the code disc 12 to turn once. If, on the other hand, the image 22(a) of the $\gamma$ - pattern of the code disc 12 passes the light-pen position P$(\gamma,\theta)$, and if the image 22(b) of the $\gamma$ - pattern then passes the light-pen position P $(\gamma,\theta)$ after $n_2$ pulses of the clock signal are counted, then the following relationship is obtained between $\gamma$ and $n_2$:

$$\gamma = k\phi = \pi k n_2/m \qquad (2).$$

In the above equations (1) an (2), the parameters $k$ and $m$ are considered constant, so that the variables $\theta$ and $\gamma$ will be proportional to the pulse numbers $n_1$ and $n_2$ of the clock signal, respectively. This implies that these pulse numbers $n_1$ and $n_2$ of the clock signal express the light-pen position P $(\gamma,\theta)$ in polar coordinates as a digital quantity. If, on the other hand, it is intended to obtain the light-pen position P $(X,Y)$ in rectangular coordinates, the particular position can be calculated by the following equations: (X, Y)

$$X = \gamma\cos\theta + b; \text{ and}$$
$$Y = \gamma\sin\theta + a.$$

The conversion from the position P ($\gamma,\theta$) in polar coordinates to the position P (X, Y) in rectangular coordinates can be easily made using an information processing system such as an electronic computer, which is electrically connected to the coordinate detecting apparatus according to the present invention. Likewise, the conversion can be easily calculated by fabricating a conversion circuit which is designed exclusively therefor and which is incorporated into the coordinate detecting apparatus of the present invention.

If, moreover, the code disc 12 is rotated at a speed higher than 30 revolutions per second, detrimental influences of the residual images, which might otherwise be produced from the images both of the $\theta$ - pattern 21 and the $\gamma$ - pattern 22, upon the observer of the optical projector can be effectively eliminated.

A specific circuit, which is used for obtaining the light-pen position P ($\gamma,\theta$) by counting the clock numbers $n_1$ and $n_2$, will now be described in conjunction with FIG. 6, which is a block diagram of a coordinate detecting circuit. At first, the observer indicates, using the light pen 11, a desired portion of the picture image which is projected upon the screen 7. The light pen 11 is a photoelectric detector having a built-in photoelectric element, and produces a signal, as shown in FIG. 5(a), when the $\theta$ - pattern image 21 and the $\gamma$ - pattern image 22 of the code disc 12, which are projected on the screen 7 by the action of the projecting lens 5, of the particular light-pen position. After the signal thus produced is amplified and then is transmitted through a differentiation circuit 31, it takes the wave form as shown in FIG. 5(c). This signal then passes the Schmidt circuit 32, which is rendered conductive at a constant negative level of - EV and non-conductive at a zero level, so that the signal takes the wave form of FIG. 5(d). Then, the signal indicates the instant at which the falling pont 30 corresponds to the extreme value 29 of the input signal of FIG. 5(a), that is to say, the instant at which the $\theta$ - pattern image 21 and the $\gamma$ - pattern image 22 of the code disc 12 on the screen 7 passes the light-pen position. This signal is the light-pen signal 52, which has been described previously. The clock pattern 20 and the start line 23 are, on the other hand, converted into electric signals and amplified by photoelectric elements 13 and 14, respectively, to be the clock signal 50 and the start signal 51, respectively.

Reference will now be made to FIG. 7, which is a time chart for the light-pen signal 52, the clock signal 50 and the start signal 51. During the time period required for the code disc 12 to turn once, the light-pen signal 52, the clock signal 50 and the start signal 51 will produce three pulses, m pulses and one pulse, respectively. Of the three pulses of the light-pen signal 52, the first pulse 60 is produced by the $\theta$ - pattern 21, and the second and third pulses 61 and 62 are produced by the $\gamma$ - pattern 22. Thus, both a gate circuit 45 which is rendered conductive during the time period between the start signal 51 and the first pulse 60 of the light-pen signal 52, and a gate circuit 46 which is rendered conductive during the time period between the second and third pulses of the light-pen signal 52 are constructed, and the pulse numbers $n_1$ and $n_2$ of the clock signal 50 passing through the respective gate circuits are counted by counters 37 and 38, respectively. The numbers $n_1$ and $n_2$ thus obtainable will indicate the position, which is indicated by the light pen 11, in digital quantities of the desired polar coordinates. Turning now to FIG. 6, the gate circuit 45 is composed of flip-flop circuits 33 and 34 and of a NAND gate 35, whereas the gate circuit 46 is composed of the flip-flop circuits 33 and 34 and of a NAND gate 36. Incidentally, the light pen 11 is equipped with a start button for starting its reading operation, by which the light pen 11 can produce a signal when it is pushed onto the screen 11. This signal is operative to block the shift pulses of shift registers 39 and 40 and to allow the oututs of the counters 37 and 38, only when the light pen 11 is pushed onto the screen 7, to be shifted to the shift registers 39 and 40, so that new coordinate signals 42 and 43 to the outside can be produced.

Although, in the above embodiment for the electric circuit, the clock signal 50 is detected from the code disc 12 and is used as a reference to detect the light-pen position P ($n_1$, $n_2$) in coordinates, another system is conceivable, in which the code disc 12 is rotated at a constant speed and in which the clock signal produced can be replaced by the output of another pulse generator.

As has been described previously, in an optical projector to which the coordinate detecting apparatus of the invention is added, when an observer of the optical projector directly indicates a desired portion of the picture image, which is projected on a screen, using a light pen, then the information concerning the picture image portion can be supplied externally as a digital output signal by detecting the particular information as a polar coordinate position P ($\gamma,\theta$) or P ($n_1$, $n_2$). This digital signal is introduced into an information processing system such as an electronic computer, in which it is processed as it is or after being converted into information in rectangular coordinates.

It should be appreciated an advantage of the present invention is that the coordinate detecting apparatus of the invention can be used with an optical projector without slightly modifying the optical system nor the screen of the optical projector. It should be appreciated that another advantage of the present invention is that, since the code disc of the coordinate detecting apparatus thus applied to the optical projector is rotating at a high speed, the code disc image is not viewable by the observer and does not detrimentally influence the quality of the picture image which is projected on the screen.

In the foregoing embodiment, the code plate has the form of a disc, and the use of this code disc invites the disadvantage that, since the light-pen position is detected in polar coordinates, a suitable post treatment is required for obtaining the information in rectangular coordinates. However, advantages sufficiently counteracting the above disadvantage as enumerated in the following can be obtained, since the code disc has a construction which turns about a central axis;

1. The drive mechanisms required for the code disc can be remarkably simplified:
2. The code disc can be miniature in size:
3. A two-dimensional information about the coordinate can be obtained with use of a single disc.

From these marked ad· ntages, the coordinate detecting apparatus of the invention can be fabricated in a simple manner and accordingly results in reduced production cost. When, however, it is intended to directly obtain the coordinate position in rectangular coordinates even with the resultant sacrifice of the above advantages coming from the disc construction, the code disc can be replaced by plates or the like. Such can be applicable, for example, when the coordinate detecting apparatus of the present invention is not connected with an information processing system such as an electronic computer, or when the conversion, which is effected between the polar coordinates and the rectangular coordinates using suitable electric circuits, is not considered very important.

While the invention has been described in detail and with reference to specific embodiments thereof, it will be apparent to one skilled in the art that various changes and modifications can be made without departing from the spirit and scope thereof.

What is claimed is:

1. A coordinate detecting apparatus for an optical projector, comprising:
   a rotary code disc having thereon a clock pattern, a start line, a $\theta$-pattern and an r-pattern, said clock pattern being provided about the periphery of said disc, said $\theta$-pattern being a half line passing through the rotation center of said disc, said r-pattern including divergent curves passing through rotation center of said disc, the projections of said $\theta$-pattern and said r-pattern being imposed on a picture image on a screen;
   a rotating means for rotating said code disc;
   a light pen adapted to be used in cooperation with the picture image screen to photoelectrically detect said projections of said $\theta$-pattern and said r-pattern through said screen;
   photoelectric means adjacent said code disc for detecting said clock pattern and said start line on the rotating code disc; and
   an electric circuit responsive to the outputs of said lightpen and said photoelectric means for counting the clock signal from said photoelectric means in response to the detected projections of said $\theta$-pattern and said r-pattern to produce digital polar coordinate signals of the position of said lightpen with respect to the picture image on the screen.

2. The coordinate detecting apparatus according to claim 1, wherein said electric circuit comprises:
   a first counter for accumulating a digital count proportional to the $\theta$ coordinate;
   a second counter for accumulating a digital count proportional to the r coordinate;
   first gating means connected to receive said clock signals and controlled by the detected projection of said $\theta$-pattern from said light pen for passing said clock signals to said first counter; and
   second gating means connected to receive said clock signals and controlled by the detected projection of said r-pattern from said light pen for passing said clock signals to said second counter.

3. The coordinate detecting apparatus according to claim 2, wherein said code disc is disposed at a position out of the focus point of an optical system of the optical projector, wherein said electric circuit further comprises correcting circuit means for correcting the signal of said light pen resulting from said code disc being out of the focus point of the optical system to produce a corrected signal to said first and second gating means.

4. The coordinate detecting apparatus according to claim 3, wherein said correcting circuit means comprises:
   a differentiator for differentiating the output of said light pen; and
   a Schmidt trigger connected to receive the output of said differentiating circuit to produce a pulse output for controlling said first and second gating means.

* * * * *